(12) United States Patent
Borella et al.

(10) Patent No.: US 6,781,982 B1
(45) Date of Patent: Aug. 24, 2004

(54) METHOD AND SYSTEM FOR ALLOCATING PERSISTENT PRIVATE NETWORK ADDRESSES BETWEEN PRIVATE NETWORKS

(75) Inventors: Michael S. Borella, Naperville, IL (US); Nurettin B. Beser, Evanston, IL (US); David Grabelsky, Skokie, IL (US)

(73) Assignee: 3Com Corporation, Marlborough, MA (US)

( * ) Notice: Subject to any disclaimer, the term of this patent is extended or adjusted under 35 U.S.C. 154(b) by 0 days.

(21) Appl. No.: 09/426,839

(22) Filed: Oct. 26, 1999

(51) Int. Cl.[7] .............................................. H04L 12/66
(52) U.S. Cl. ........................ 370/352; 370/353; 370/355; 370/401
(58) Field of Search ................................ 370/351–356, 370/465–467, 400–401, 475; 709/245

(56) References Cited

U.S. PATENT DOCUMENTS

| | | | |
|---|---|---|---|
| 4,953,198 A | 8/1990 | Daly et al. | 379/61 |
| 5,327,365 A | 7/1994 | Fujisaki et al. | 364/717 |

(List continued on next page.)

FOREIGN PATENT DOCUMENTS

| | | | |
|---|---|---|---|
| WO | WO 01/31888 A1 | 5/2001 | H04L/29/06 |

OTHER PUBLICATIONS

Foster, Ian, "*10 Random Numbers*", 1995.

(List continued on next page.)

*Primary Examiner*—Alit Patel
*Assistant Examiner*—Yvonne Quy Ha (74) *Attorney, Agent, or Firm*—McDonnell Boehnen Hulbert & Berghoff LLP (57) ABSTRACT

A method and system for allocating persistent private network addresses between private networks. An Internet Protocol ("IP") address of a multimedia device (e.g., a Voice-over-IP ("VoIP") device) is publicly available and the device, the device's location or the device's user may be identified and become the target of a hacker. Persistent private IP addresses may be used for such multimedia devices. Persistent private IP addresses are unique and persistent for a duration of a multimedia session between two private networks. The persistent private IP addresses are not routable on a public network like the Internet. The persistent private IP addresses allow a first network device on a first private network to establish a data session with a second network device on a second private network over a public network such as the Internet. The first network device and the second network device negotiate a pair of private IP addresses that are persistent, private and unique across both the first private network and the second private network address space. The persistent private IP addresses may be allocated by Distributed Network Address Translation ("DNAT") or Realm Specific Internet Protocol ("RSIP") servers. The method and system allow a first private network to determine an estimated number of persistent private IP addresses to send to a second private network such that the second private network can select at least one pair of persistent private IP addresses that is not in use on the second private network with high probability of success (e.g., about 99.9% or greater). The method and system may improve security of multimedia data sessions (e.g., VoIP) and allow two private networks using private IP addresses to communicate over a public network like the Internet.

22 Claims, 5 Drawing Sheets

U.S. PATENT DOCUMENTS

| | | | | |
|---|---|---|---|---|
| 5,497,339 | A | | 3/1996 | Bernard .................... 364/705.5 |
| 5,526,353 | A | | 6/1996 | Henley et al. ............. 370/60.1 |
| 5,526,489 | A | | 6/1996 | Nilakantan et al. ..... 395/200.02 |
| 5,550,984 | A | * | 8/1996 | Gelb .......................... 709/245 |
| 5,604,737 | A | | 2/1997 | Iwami et al. ................ 370/352 |
| 5,606,594 | A | | 2/1997 | Register et al. ............... 379/58 |
| 5,654,957 | A | | 8/1997 | Koyama ...................... 370/355 |
| 5,737,333 | A | | 4/1998 | Civanlar et al. ............ 370/352 |
| 5,742,596 | A | | 4/1998 | Baratz et al. ............... 370/356 |
| 5,754,547 | A | | 5/1998 | Nakazawa .................. 370/401 |
| 5,793,657 | A | | 8/1998 | Nemoto ................. 364/717.01 |
| 5,835,723 | A | | 11/1998 | Andrews et al. ....... 395/200.56 |
| 5,862,331 | A | | 1/1999 | Herriot .................. 395/200.49 |
| 5,867,495 | A | | 2/1999 | Elliott et al. ................ 370/352 |
| 5,889,774 | A | | 3/1999 | Mirashrafi et al. .......... 370/352 |
| 5,892,924 | A | | 4/1999 | Lyon et al. ............ 395/200.75 |
| 5,915,008 | A | | 6/1999 | Dulman ...................... 379/201 |
| 5,933,778 | A | | 8/1999 | Buhrmann et al. ......... 455/461 |
| 5,950,195 | A | | 9/1999 | Stockwell et al. ............. 707/4 |
| 6,011,782 | A | | 1/2000 | DeSimone et al. ......... 370/260 |
| 6,055,236 | A | | 4/2000 | Nessett et al. .............. 370/389 |
| 6,055,561 | A | | 4/2000 | Feldman et al. ............ 709/200 |
| 6,058,421 | A | | 5/2000 | Fijolek et al. .............. 709/225 |
| 6,079,021 | A | | 6/2000 | Abadi et al. ................ 713/202 |
| 6,101,189 | A | | 8/2000 | Tsuruoka .................... 370/401 |
| 6,101,543 | A | | 8/2000 | Alden et al. ................ 709/229 |
| 6,104,711 | A | | 8/2000 | Voit .......................... 370/352 |
| 6,115,751 | A | | 9/2000 | Tam et al. ................... 709/240 |
| 6,134,591 | A | | 10/2000 | Nickles ....................... 709/229 |
| 6,137,791 | A | | 10/2000 | Frid et al. ................... 370/352 |
| 6,157,950 | A | * | 12/2000 | Krishnan .................... 709/223 |
| 6,172,986 | B1 | | 1/2001 | Watanuki et al. ........... 370/466 |
| 6,185,184 | B1 | | 2/2001 | Mattaway et al. .......... 370/230 |
| 6,195,705 | B1 | | 2/2001 | Leung ......................... 709/245 |
| 6,212,183 | B1 | | 4/2001 | Wilford ....................... 370/392 |
| 6,212,563 | B1 | | 4/2001 | Beser .......................... 709/227 |
| 6,249,820 | B1 | | 6/2001 | Dobbins et al. ............ 709/238 |
| 6,266,707 | B1 | | 7/2001 | Boden et al. ............... 709/245 |
| 6,269,099 | B1 | | 7/2001 | Borella et al. .............. 370/389 |
| 6,331,984 | B1 | * | 12/2001 | Luciani ....................... 370/401 |
| 6,353,614 | B1 | | 3/2002 | Borella et al. .............. 370/389 |
| 6,353,891 | B1 | | 3/2002 | Borella et al. .............. 713/201 |
| 6,442,616 | B1 | * | 8/2002 | Inoue et al. ................. 709/245 |
| 6,496,511 | B1 | * | 12/2002 | Wang et al. ................. 370/401 |
| 6,563,824 | B1 | * | 5/2003 | Bhatia et al. ............... 370/392 |
| 6,611,516 | B1 | * | 8/2003 | Pirkola et al. .............. 370/352 |

OTHER PUBLICATIONS

Borella, Michael et al., "*Realm Specific IP: Protocol Specification*", <draft–ietf–nat–rsip–protocol–02.txt>, Internet Draft, Aug. 1999, pps. 1–27.

Gilligan, R. et al., "*Transition Mechanisms for IPv6 Hosts and Routers*", RFC 1933, Apr. 1996, pps. 1–22.

Afifi, H. et al., "*Method for IPv4–IPv6 Transition*", Proceedings IEEE International Symposium on Computers and Communications, Jul. 6–8, 1999, pps. 478–484.

Borella, Michael, *Technology Update—Protocol Helps Stretch IPv4 Addresses,* "Network World", vol. 17, No. 3, Jan. 17, 2000, p. 43.

Kent, Stephen, *Evaluating Certification Authority Security,* Aerospace Conference, 1998 IEEE, Online, vol. 4, pp. 319–327 (Mar. 21–23, 1998).

Thayer, Rodney, *Bulletproof IP with Authentication and Encryption IPSec Adds a Layer of Armor to IP,* Data Communications, vol. 26, No. 16, pp. 55–58, 60 (Nov. 21, 1997).

Borella, M., Grabelsky, D., Lo, J., Tuniguchi, K., Internet Engineering Task Force, Internet Draft, "Realm Specific IP: Protocol Specification <draft–ietf–nat–rsip–protocol–.06.txt>", Mar. 2000, pp. 1–48.

Borella, M., Grabelsky, D., Lo, J., Tuniguchi, K., Internet Engineering Task Force, Internet Draft, "Realm Specific IP: Protocol Specification <draft–ietf–nat–rsip–protocol–.07.txt>", Jul. 2000, pp. 1–49.

Montenegro, G., Internet Engineering Task Force, Internet Draft, "RSIP Support for End–to–End IPsec," <draft–ietf–nat–rsip–ipsec–04.txt>, Jul. 2000, pp. 1 to 17.

Borella, M., Lo, J., Grabelsky, D., Montenegro, G., Internet Engineering Task Force, Internet Draft, "Realm Specific IP: Framework <draft–ietf–nat–rsip–framework–.05.txt>", Jul. 2000, pp. 1–30.

Borella, M., Montenegro, G., *RSIP: Address Sharing with End–to–End Security,* USENIX Conference, San Francisco, California, Mar. 9, 2000, pp. 1–9.

Handley, M., et al. *SIP: Session Initiation Protocol,* Network Working Group, Request for Comments 2543, Mar. 1999, pp. 1 to 153.

ITU–T Recommendation H.225.0, *Call Signaling Protocols and Media Stream Packetization for Packet–Based Multimedia Communication Systems,* Series H: Audiovisual and Multimedia Systems—Infrastructure of Audiovisual Services—Transmission Multiplexing and Synchronization, (Feb., 1998).

ITU–T Recommendation H.323, *Packet–Based Multimedia Communications Systems,* Series H: Audiovisual and Multimedia Systems—Infrastructure of Audiovisual Services—Systems and Terminal Equipment for Audiovisual Services, (Feb., 1998).

McCanne et al., "The BSD Packet Filter: A New Architecture for User–Level Packet Capture," Proceedings of the 1993 Winter USENIX Technical Conference (Jan. 1993).

Postel, J., *User Datagram Protocol,* Request for Comments 768, Aug. 1980, pp. 1 to 3.

Postel, J., *Internet Protocol,* Request for Comments 791, Sep. 1981, pp. I to 45.

Postel J., *Internet Control Message Protocol,* Request for Comments 792, Sep. 1981, pp. 1 to 21.

Postel, J., *Transmission Control Protocol,* Request for Comments 793, Sep. 1981, pp. i to 84.

Postel, J., *File Transfer Protocol (FTP),* Request for Comments 959, Oct. 1985, pp. 1 to 69.

Jacobson, V., *TCP Extensions for High Performance,* Request for Comments 1323, May 1992, pp. 1 to 37.

Droms, R., *Dynamic Host Configuration Protocol,* Request for Comments 2131, Mar. 1997, pp. 1 to 45.

Stevens, W., *Advanced Sockets API for IPv6,* Request for Comments 2292, Feb. 1998, pp. 1 to 67.

Gilligan, R. et al., *Basic Socket Interface Extensions for IPv6,* Request for Comments 2553, Mar. 1999, pgs. 1 to 41.

Srisuresh, P., et al., *IP Network Address Translator (NAT) Terminology and Considerations,* Request for Comments 2663, Aug. 1999, pp. 1 to 30.

Maurice J. Bach, The Design of the Unix Operating System, Prentice Hall Software Series, 1986, pp. 382–390.

"Cisco IOS Release 12.0 Network Protocols Configuration Guide, Part 1", Configuring IP Addressing, Cisco Systems, 1998, pp. P1C–7 to P1C–58.

Durand, Alain, *Deploying Ipv6,* IEEE Internet Computing, http://computer.org/internet, Jan.–Feb. 2001, pp. 79–81.

3COM SIP Solutions 1.0 benefits brochure. (4 total pages).

Sidhu, Ikhlaq and Bezaitis, Andrew, Eat or be eaten, www.americasnetwork.com/issues/99issues/991101/991191_eat.htm, printed May. 10, 2000. (6 total pages).

Myers, Brad A.; Stiel, Herb; and Gargiulo, Robert, Collaboration Using Multiple PDAs Connected to a PC, Proceedings of the ACM 1998 conference on Computer supported cooperative work, Nov. 14–18, 1998, Seattle, WA. (total of 11 pages).

Dalgic, Ismail; Borella, Michael; Dean, Rick; Grabiec, Jacek; Mahler, Jerry; Schuster, Guido; and Sidhu, Ikhlaq, True Number Portability and Advanced Call Screening in a SIP–Based IP Telephony System, *IEEE Communications Magazine,* vol. 37, No. 7, Jul. 1999, pp. 96–101. (8 total pages).

Handley/Schulzrinne/Schooler/Rosenberg, SIP: Session Initiation Protocol, Internet Engineering Task Force, draft–ietf–sip–rfc2543bis–02.ps. Sep. 4, 2000. (131 pages).

Borella, M., Lo, J., Grabelsky, D., Montenegro, G., IETF Proceedings presentation, Realm Specific IP: Protocol Specification <draft–nat–rsip–protocol–00.txt>, Apr. 9, 1999 (13 pages).

Marsan, Carolyn Duffy, The Next Best Thing to Ipv6? Network Fusion at http://www.nbwfusion.com/news/1999/0920ipv6.html, Mar. 29, 2000, pp. 1–3.

Borella, M., Lo, J., Grabelsky, D., Montenegro, G., Internet Engineering Task Force, Internet Draft, "Realm Specific IP: Framework <draft–ietf–nat–rsip–framework–.04.txt>", Mar. 2000, pp. 1–30.

IETF Mar. 1999 Proceedings, 2.7.10 Network Address Translators (nat), pp. 1–13.

Rosenberg, Jonathan D. and Shockey, Richard, The Session Initiation Protocol (SIP): A Key Component for Internet Telephony, ComputerTelephony.com, Jun. 2000, pp. 124–139.

Fenner, W., *Internet Group Management Protocol Version 2,* RFC 2236, Nov. 1997, pp. 1–24.

Mogul, J. et al., "*Internet Standard Subnetting Procedure*", RFC 950, Aug. 1985, pp. 1–18.

Schulzrinne et al., "*RTP: A Transport Protocol for Real–Time Applications*", RFC 1889, pp. 1–75.

Privat, Jermone, "*Double Phase DHCP Configuration*", <draft–privat–dhc–doublephase–01.txt>, Internet Engineering Task Force, Sep. 1999, pp. 1–4.

Maughan, D. et al., "*Internet Security Association and Key Management Protocol*", RFC 2408, Nov. 1998, pps. 1–86.

Karn, P., "*Photuris Session–Key Management Protocol*", RFC 2522, Mar. 1999, pps. 1–58.

"*Random Number Generators*", Computational Science Education Project, 1991, 1992, 1993, 1994 and 1995.

\* cited by examiner

METHOD AND SYSTEM FOR ALLOCATING PERSISTENT PRIVATE NETWORK ADDRESSES BETWEEN PRIVATE NETWORKS

FIELD OF INVENTION

This invention relates to computer networks. More specifically, it relates to a method and system for allocating persistent private network addresses between private networks.

BACKGROUND OF THE INVENTION

The Internet Protocol ("IP") is an addressing protocol designed to facilitate the routing of traffic within a network or between networks. The Internet Protocol is used on many computer networks including the Internet, intranets and other networks. Current versions of Internet Protocol such as Internet Protocol version-4 ("IPv4") are becoming obsolete because of limited address space. With a 32-bit address-field, it is possible to assign $2^{32}$ different addresses, which is 4,294,967,296, or greater than 4 billion globally unique addresses.

However, with the explosive growth of the Internet and intranets, Internet Protocol addresses using a 32-bit address-field may soon be exhausted. Internet Protocol version-6 ("IPv6") proposes the use of a 128-bit address-field for IP addresses. However, a large number of legacy networks including a large number of Internet subnets will still be using older versions for Internet Protocol with a 32-bit address space for many years to come.

Network Address Translation ("NAT") has been proposed to extend the lifetime of Internet Protocol version 4 by allowing subnets with private Internet Protocol addresses to exist behind a single or small number of globally unique Internet Protocol addresses (see e.g., Internet Engineering Task Force ("IETF") RFC-2663, "IP Network Address Translator ("NAT") Terminology and Considerations," P. Srisuresh and M. Holdrege, August 1999). Multiple private hosts use a single global Internet Protocol address for communication with external networks such as the Internet.

Internally, a sub-network ("subnet") uses local private addressing. Local addressing may be any addressing scheme that is different from public Internet Protocol addressing, or a private non-unique use of Internet Protocol addresses. In either case, local addresses on a subnet are not used on a external, global Internet Protocol network. When a device or node using local addressing desires to communicate with the external world, its local address is translated to a common external Internet Protocol address used for communication with an external network by a network address translation device. That is, network address translation allows one or more global Internet Protocol addresses to be shared among network devices using a larger number of local private addresses.

There are several problems associated with using network address translation to extend the life of the Internet Protocol. Network address translation interferes with the end-to-end routing principal of the Internet that recommends that packets flow end-to-end between network devices without changing the contents of any packet along a transmission route (see e.g., "Routing in the Internet," by C. Huitema, Prentice Hall, 1995, ISBN 0-131-321-927).

Current versions of network address translation replace a local network address in a data packet header with an external global network address on outbound traffic, and replace an external global network address in a data packet header with a local private network address on inbound traffic. This type of address translation is computationally expensive, causes security problems by preventing certain types of encryption from being used, or breaks a number of existing applications that cannot coexist with network address translation (e.g., File Transfer Protocol ("FTP")).

Current versions of network address translation may not gracefully scale beyond a small subnet containing a few dozen nodes or devices because of the computational and other resources required. Network address translation potentially requires support for many different application layer network protocols be specifically programmed into a translation mechanism device such as a network address translation router.

Computational burdens placed on a network address translation router may be significant and degrade network performance, especially if several network address translation-enabled sub-networks share the same network address translation router. In a worst case scenario, a network address translation router translates every inbound and outbound data packet.

The Internet Engineering Task Force ("IETF") has assigned three sets of private Internet Protocol addresses: 10.0.0.0/8, 172.16.0.0/12 and 192.168.0.0/16. The number after the "/" indicates a number of bits used as a private network identifier. For example, the "/8" indicates that the first eight bits are used as a private network identifier. A network address represented as "network address/n-network bits" indicates that the first n-network bits represent a network identifier. The number of bits remaining represent the number of available host network addresses. For example, if a total of 32 bits are used for a network address (e.g., 32-its for IPv4 addresses) and a "network address/8" notation is used, then 32−8=24 bits remain for host network addresses. In this example at most $2^{24}$ host network addresses are available. Thus, the three sets of private Internet Protocol addresses: 10.0.0.0/8, 172.16.0.0/12 and 192.168.0.0/16 include at most $2^{24}$, $2^{20}$, and $2^{16}$ addresses respectively. A private network may use any of these addresses without consulting any official Internet administrative entity. However, these private addresses are not routable to/from the public Internet. Thus, more than one private network may reuse the same address without creating an addressing or routing ambiguity.

In many instances, network devices using private address spaces are connected to the public Internet Protocol network such as the Internet or an intranet with a network address translation router. The network address translation router changes a source Internet Protocol address of outbound data packets leaving the private address space to a public Internet Protocol address., For inbound data packets, the network address translation router changes a public Internet Protocol address of data packets entering the private address space to an appropriate private Internet Protocol address. However, this network address translation in a network address translation router suffers from the problems described above.

Some of the problems associated with network address translation of private network addresses into public network addresses have been overcome with Distributed Network Address Translation ("DNAT") described in co-pending applications Ser. Nos. 09/035,600, 09/270,967 and 09/271,025 assigned to the same Assignee as the present application. See also "Distributed Network Address Translation", by Michael Borella, David Grabelsky, Ikhlaq Sidhu, and Brian Petry, IETF Internet Draft, <draft-borella-aatn-dnat-01.txt>, October 1998. Distributed Network Address Translation is also called "Realm Specific Internet Protocol" ("RSIP") by the IETF. For more information on Realm Specific Internet Protocol see "Realm Specific IP Framework," by M. Borella and J. Lo, IETF draft, <draft-ieft-nat-rsip-framework-02.txt>, October 1999, and "Realm Specific IP: Protocol Specification," by M. Borella and J. Lo, IETF draft, <draft-ietf-nat-rsip-protocol-02.txt>, August 1999.

Distributed Network Address Translation is used with private small office network, home office networks or other private stub networks or subnets that have multiple network devices with private network addresses using a common external global public network address to communicate with an external network such as the Internet.

As multimedia devices on private networks use the Internet or other Internet Protocol Networks for services such as audio and/or video conferencing (e.g., H.323, H.324, CUSeeME, RealAudio, Internet Relay Chat, Voice over Internet Protocol ("VoIP"), etc.) there is a need to maintain the privacy of multimedia endpoint devices. If the Internet Protocol address of a multimedia device is publicly available, a device, a device's location, or a device's user may be identifiable. Furthermore, a public Internet Protocol address may itself become the target of an attack from a hacker, who may try a "denial of service" or other attacks to try and steal network services, network resources or data from a private network.

One solution to this problem is to use private Internet Protocol addresses for multimedia endpoint devices. The private Internet Protocol addresses are randomly assigned and are allocated to a particular device for only the duration of the multimedia session. If the private Internet Protocol addresses are not transmitted in a readable form (e.g., clear text) on the public Internet, then the multimedia endpoint devices are afforded a greater degree of privacy and protection.

In addition to the network address translation problems described above, there are several other problems associated with using private network addresses for multimedia endpoint devices and other endpoint devices. One problem is that the originating and terminating multimedia devices need private Internet Protocol addresses that are private, and unique across both the originating and terminating private networks for a duration of a multi-media session. For example, an originating multimedia device is assigned a private Internet Protocol address of 10.0.0.1 on a first private network. Thus, only one private Internet Protocol address of 10.0.0.1 can be used on the first private network and the second private network at any one time. Use of the private Internet Protocol address 10.0.0.1 once selected, should also persist for at least a duration of a desired multimedia session on the first and second private networks.

Another problem is that it is desirable to minimize the number of negotiations for selecting private addresses between the originating and terminating devices during initialization and set-up of a multimedia or other session. If multiple roundtrips are required in order to resolve the use of addresses, then a significant delay may occur, causing undesirable effects on the initialization of a communications session. The multiple roundtrips may also increase the risk of attacks from hackers who may intercept multiple data packets on one of the multiple round trips.

Another problem is that a first network may transmit a large number of private network addresses that a second network can select from in a negotiation message. However, this also requires a very large data packet be sent. The large data packet requires additional processing on both networks to select a private network address. In addition, the large number of private network addresses reserved for the negotiation are unavailable to use for other private network address negotiations. This may significantly decrease response time and performance of the first private network.

Thus, it is desirable to provide a solution in which a first private network can determine an estimated number of private network addresses to offer to a second private network. The method should allow the estimated number of private network addresses to be offered from a first private network with a high statistical probability (e.g., about 99% or greater) such that the second private network is able select at least one pair of private network addresses not in use on the second private network from the set offered by the first private network without further negotiation.

SUMMARY OF THE INVENTION

In accordance with preferred embodiments of the present invention, some of the problems with using private network addresses are overcome. A method and system for allocating persistent private network addresses between private networks is provided. One aspect of the invention includes a method for dynamic allocation of persistent private network addresses. The method includes estimating a value of n on a private network-x where n is used to estimate of a number-n of persistent private network addresses that is not in use on a private network-y. The value of n is estimated using a network utilization value for the private network-y and a desired probability of success for selecting a pair of private network addresses that are not in use on the private network-y. The value of n is used to select n-number of private network addresses to send from the private network-x to the private network-y over a secure virtual tunnel over a public network like the Internet. The value of n is an estimation of a number of private network addresses that the private network-x needs to send to the private network-y such that private network-y will find at least one pair of persistent private network address not in use on the private network-y.

Another aspect of the invention includes a method for persistent private address allocation with table look-up. This method includes maintaining a table on a network device on a private network-x including multiple estimated values of n to determine an estimated number-n of persistent private network addresses used to select a pair of persistent private network addresses that are not in use on a private network-y. The table is created using multiple network utilization values from the private network-y and multiple desired probability of successes for selecting one pair of persistent private network address that are not in use on the private network-y.

The methods and system described herein may allow a private network-x to determine an estimation of n, a number of persistent private network addresses to send to a private network-y. Using the estimation of n, the private network-x can expect the private network-y to select at least one pair of persistent private network address from the n-number of persistent private network addresses sent that are not in use on the private network-y with a high probability of success (e.g., about 99.9% or greater). The methods and system may improve security of multimedia data sessions (e.g., VoIP) between two private networks using persistent private network addresses to communicate over a public network like the Internet. The methods and system may also decrease multimedia session set-up times and improve network utilization.

The foregoing and other features and advantages of a preferred embodiment of the present invention will be more readily apparent from the following detailed description.

The detailed description proceeds with references to the accompanying drawings.

BRIEF DESCRIPTION OF THE DRAWINGS

Preferred embodiments of the present inventions are described with reference to the following drawings, wherein.

DETAILED DESCRIPTION OF PREFERRED EMBODIMENTS

Exemplary Network System

Figure 1:
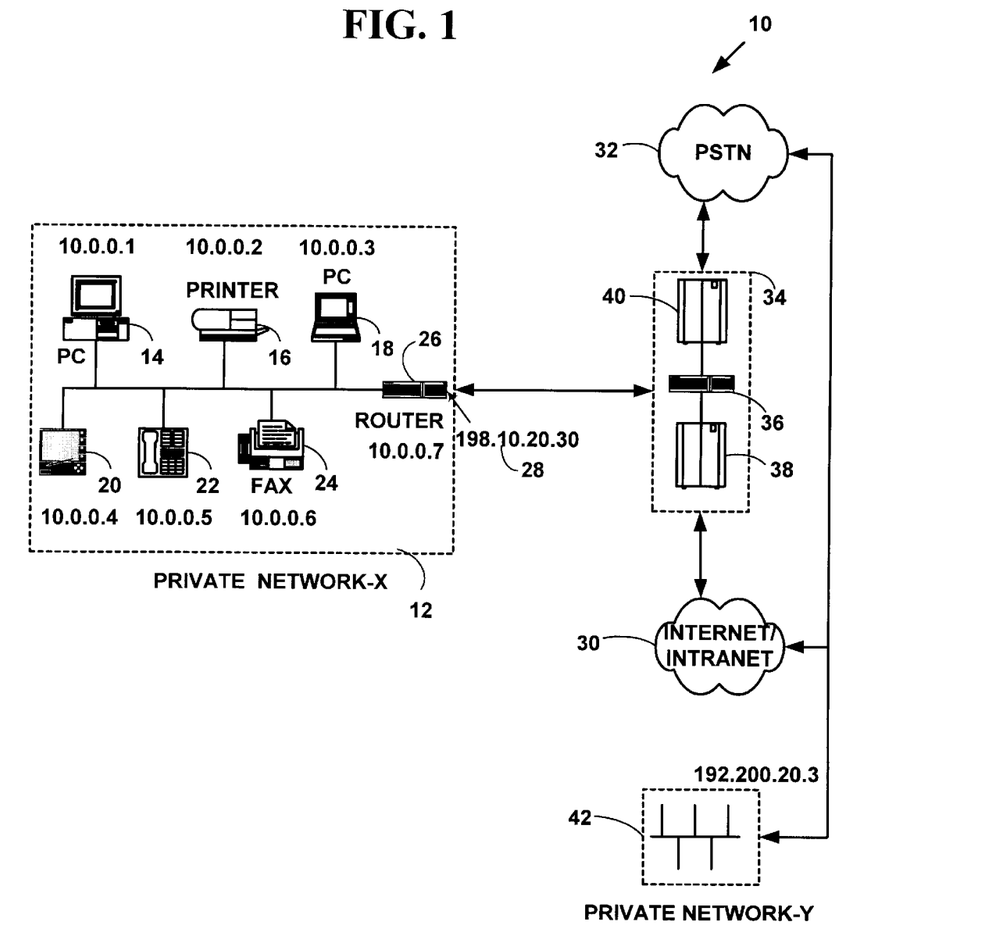
FIG. 1 is a block diagram illustrating an exemplary network system for persistent private network address allocation.

FIG. 1 is a block diagram illustrating an exemplary network system 10 for one preferred embodiment of the present invention. The network system 10 includes a first private computer network-x 12 with multiple network devices (14, 16, 18, 20, 22, 24) and a router 26 to route data packets to external computer networks. The multiple network devices include any of computers (14, 18), printers 16, facsimile devices 24, hand-held devices 20, telephones 22 or other network devices not illustrated in FIG. 1. The first computer network-x 12 has an external common network address 28 (e.g., a global Internet Protocol address, 198.10.20.30) to identify the first private computer network-x 12 to an external computer network such as a second computer network 30 and/or a third computer network 32 external to the first private computer network-x 12. The multiple network devices (14, 16, 18, 20, 22, 24, and 26) have a private internal network address (i.e., a private network address) on the first private computer network-x 12 (e.g., 10.0.0.x explained below). In one preferred embodiment of the present invention, a network access service provider 34 with a router 36 routes data packets to/from the first private computer network-x 12 to a second public computer network 30 and/or to a third public computer network 32 through a second network switch 38 and/or a third network switch 40. In another embodiment of the present invention, the first private computer network-x 12 is connected directly to the second computer network 30. The first private computer network-x 12 is also connected to a second private computer network-y 42 via public computer networks 30 or 32. The second private computer network-y 42 is also a private computer network that includes multiple network devices (not illustrated in FIG. 1) that use private internal network addresses behind a public globally routable network address of (e.g., a global Internet Protocol address 192.200.20.3).

In one preferred embodiment of the present invention, the first private computer network-x 12 is a Small Office/Home Office ("SOHO") Local Area Network ("LAN"), also called a "legacy" LAN. The first private computer network 12 can also be a "stub" network or a sub-network ("subnet"). As is known in the art, a stub network typically includes multiple network devices using a common external network address to communicate with an external network such as the Internet. As is known in the art, a subnet is a part of a larger network that uses a common addressing scheme (e.g., Internet Protocol addressing). The second network 30 is the Internet or an intranet, and the third network 32 is a Public Switched Telephone Network ("PSTN"). The second private-network-y 42 is also a SOHO LAN, stub network or subnet. The first private computer network-x 12 and the second private computer network-y 42 can also be cable television networks. However, other network types and network components can also be used and the present invention is not limited to the network types and network components described for this preferred embodiment. The present invention can be used with virtually any network using the Internet Protocol or other protocols in the Internet Protocol suite.

Figure 3:
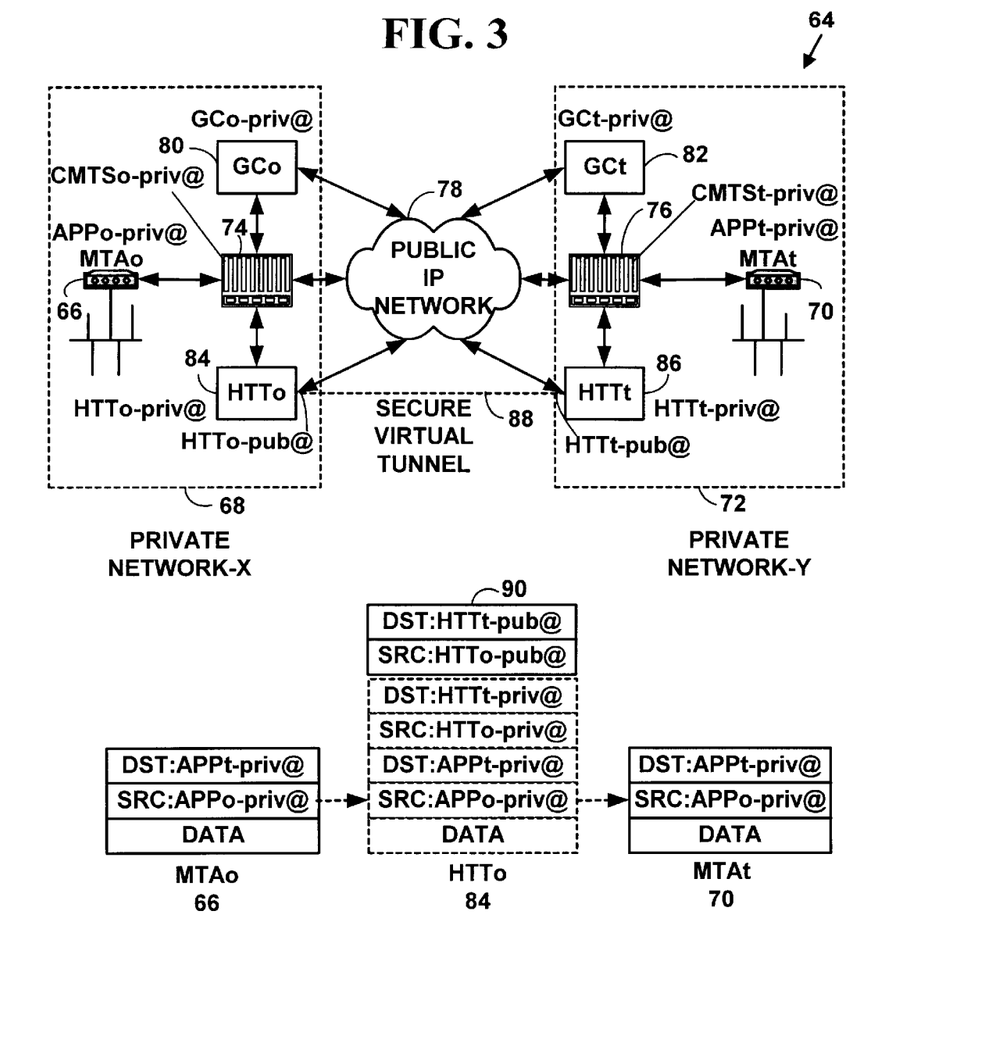
FIG. 3 is an exemplary network system for establishing data sessions between two privately addressed networks.

Network devices and routers for preferred embodiments of the present invention include network devices that can interact with network system 10 and network system 64 discussed below that are compliant with all or part of standards proposed by the Institute of Electrical and Electronic Engineers ("IEEE"), International Telecommunications Union-Telecommunication Standardization Sector ("ITU"), Internet Engineering Task Force ("IETF"), the Wireless Application Protocol ("WAP") Forum, or Data-Over-Cable-Service-Interface-Specification ("DOCSIS") standards for Multimedia Cable Network Systems ("MCNS"). However, network devices based on other standards could also be used. IEEE standards can be found on the World Wide Web at the Universal Resource Locator ("URL") "www.ieee.org." The ITU, (formerly known as the CCITT) standards can be found at the URL "www.itu.ch." IETF standards can be found at the URL "www.ietf.org." The WAP standards can be found at the URL "www.wap-forum.org." The DOCSIS standards can be found at the URL "www.cablemodem.com."

An operating environment for network devices and routers of the present invention include a processing system with at least one high speed Central Processing Unit ("CPU") and a memory. In accordance with the practices of persons skilled in the art of computer programming, the present invention is described below with reference to acts and symbolic representations of operations or instructions that are performed by the processing system, unless indicated otherwise. Such acts and operations or instructions are referred to as being "computer-executed" or "CPU executed."

It will be appreciated that acts and symbolically represented operations or instructions include the manipulation of electrical signals by the CPU. An electrical system represents data bits which cause a resulting transformation or reduction of the electrical signals, and the maintenance of data bits at memory locations in a memory system to thereby reconfigure or otherwise alter the CPU's operation, as well as other processing of signals. The memory locations where data bits are maintained are physical locations that have particular electrical, magnetic, optical, or organic properties corresponding to the data bits.

The data bits may also be maintained on a computer readable medium including magnetic disks, optical disks, organic memory, and any other volatile (e.g., Random Access Memory ("RAM")) or non-volatile (e.g., Read-Only Memory ("ROM")) mass storage system readable by the CPU. The computer readable medium includes cooperating or interconnected computer readable medium, which exist exclusively on the processing system or be distributed among multiple interconnected processing systems that may be local or remote to the processing system.

Exemplary Protocol Stack

Figure 2:
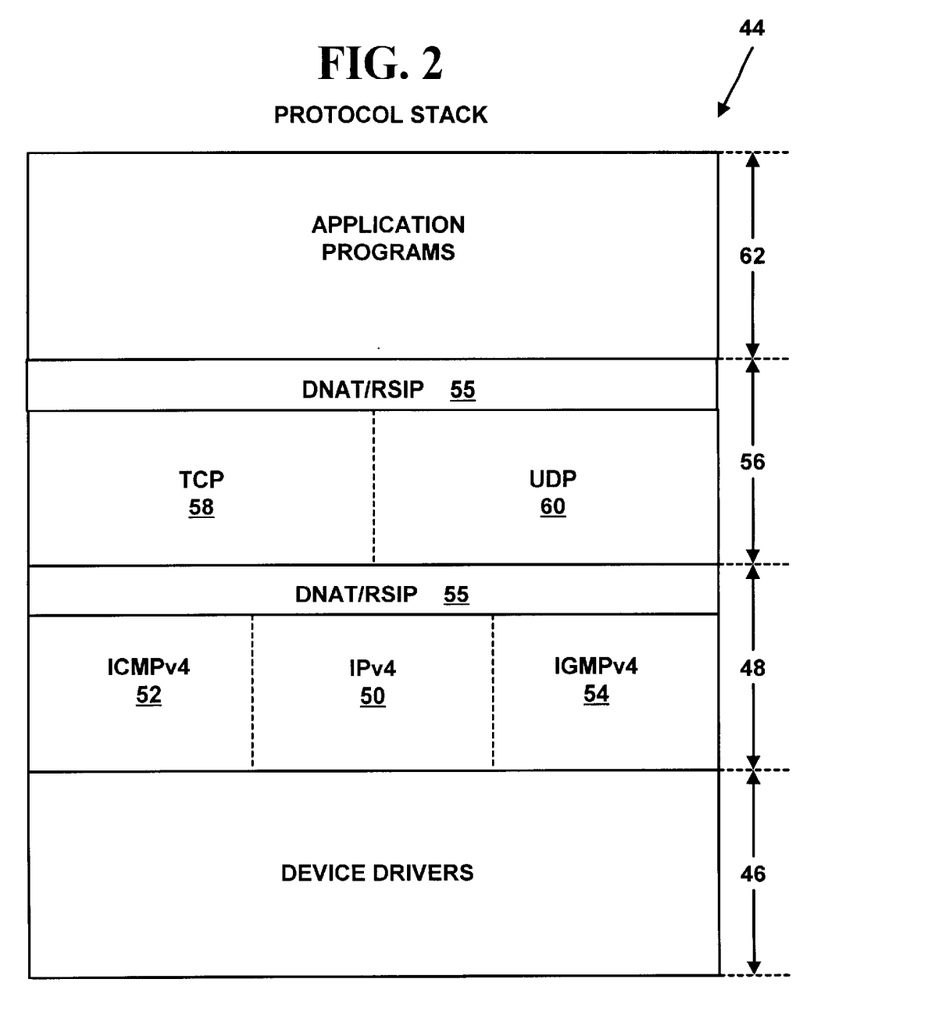
FIG. 2 is a block diagram illustrating a protocol stack for a network devices using persistent private network address allocation.

FIG. 2 is a block diagram illustrating an exemplary layered protocol stack 44 for network devices from the exemplary network system 10 (FIG. 1) and network system 64 (FIG. 3). The layered protocol stack 44 is described with respect to Internet Protocol suites comprising from lowest-to-highest, a link, network, transport and application layer. However, more or fewer layers could also be used, and different layer designations could also be used for the layers in the protocol stack 44 (e.g., layering based on the Open Systems Interconnection ("OSI") model).

The network devices (14, 16, 18, 20, 22, and 24) are connected to the first private computer network-x 12 and second private computer network-y 42 with Network Interface Card ("NIC") device drivers in a link layer 46 for the hardware network devices connecting the network devices to the computer network 12. The link layer 44 may include a Medium Access Control ("MAC") protocol layer or other data-link layer protocol. Above the link layer 44 is a network layer 48 (also called the Internet Layer for Internet Protocol suites). The network layer 48 includes an IP layer 50. As is known in the art, IP 50 is an addressing protocol designed to route traffic within a network or between networks. IP layer 50, hereinafter IP 50, is described in IETF RFC-791, incorporated herein by reference.

The network layer 48 also includes an Internet Group Management Protocol ("IGMP") layer 52, and a Control Message Protocol ("ICMP") layer 54.

ICMP layer 52, hereinafter ICMP 52, is used for Internet Protocol control. The main functions of ICMP 52 include error reporting, reachability testing (e.g., "pinging"), route-change notification, performance, subnet addressing and other maintenance. For more information on ICMP 52 see IETF RFC-792, incorporated herein by reference.

IGMP layer 54, hereinafter IGMP 54, is responsible for multicasting. For more information on IGMP 54 see IETF RFC-1112, incorporated herein by reference.

The network layer 48 may also include an optional DNAT or Realm Specific Internet Protocol ("RSIP") layer 55. The DNAT/RSIP layer 55 is used to allocate locally unique ports as well as a combination network address including a locally unique port and a common external network address (e.g., an IP address) for a DNAT or RSIP server for communications with the external networks.

For more information on DNAT, see co-pending U.S. application Ser. No. 09/035,600 incorporated herein by reference. DNAT is also referred to as "Realm Specific Internet Protocol" ("RSIP") by the IETF. For more information on RSIP see, "Realm Specific IP Framework," by M. Borella and J. Lo, IETF draft, <draft-ietf-nat-rsip-framework-02.txt>, October 1999, and "Realm Specific IP: Protocol Specification," by M. Borella and J. Lo, IETF draft, <draft-ietf-nat-rsip-protocol-02.txt>, August 1999, both incorporated herein by reference.

Above the network layer 48 is a transport layer 56. The transport layer 56 includes a Transmission Control Protocol ("TCP") layer 58, a User Datagram Protocol ("UDP") layer 60, and/or an optional DNAT/RSIP layer 55, as described above. However, more or fewer protocols could also be used.

TCP layer 58, hereinafter TCP 58, provides a connection-oriented, end-to-end reliable protocol designed to fit into a layered hierarchy of protocols which support multi-network applications. TCP 58 provides for reliable inter-process communication between pairs of processes in network devices attached to distinct but interconnected networks. For more information on TCP 58 see IETF RFC-793, incorporated herein by reference.

UDP layer 60, hereinafter UDP 60, provides a connectionless mode of communications with datagrams in an interconnected set of computer networks. UDP 60 provides a transaction-oriented datagram protocol, where delivery and duplicate packet protection are not guaranteed. For more information on UDP 60 see IETF RFC-768, incorporated herein by reference. Both TCP 58 and UDP 60 are not required in protocol stack 42. Either TCP 58 or UDP 60 can be used without the other.

Above the transport layer 52 is an application layer 62 including application programs. The application programs provide desired functionality to a network device (e.g., telephony or other communications functionality).

Exemplary Privately Addressed Network System

FIG. 3 is an exemplary network system 64 for establishing data sessions between two privately addressed networks. In one specific exemplary preferred embodiment of the present invention, network system 64 is used to support IP 50 telephony calls (e.g., Voice-over-IP ("VoIP")) between two privately addressed cable television networks. However, such a specific embodiment is exemplary only and the present invention is not limited to this specific embodiment. The methods and systems described herein can be used as a general persistent private address allocation scheme for virtually any private network using private network addresses and communicates with another private network using private network addresses over a public network (e.g., the Internet).

The exemplary network system 64 includes an originating Media Termination Adapter ("MTAo") 66 on an originating private network-x 68 and a terminating Media Termination Adapter ("MTAt") 70 on a terminating private network-y 72. In one exemplary preferred embodiment of the present invention, the MTAo 66 and the MTAt 70 are cable modems located on the premises of a "caller" and "callee" respectively connected to privately addressed cable television networks.

The privately addresses cable television networks include those provided by Comcast Cable Communications, Inc., of Philadelphia, Pa. Cox Communications of Atlanta, Ga. Tele-Communications, Inc., of Englewood Colo. Time-Warner Cable, of Marietta Ga. Continental Cablevision, Inc., of Boston Mass. and others that provide cable television services to a large number of subscribers over a large geographical area. The cable television networks typically are interconnected by cables such as coaxial cables or a Hybrid Fiber/Coaxial ("HFC") cable system which have data rates of about 10 Mega-bits-per-second ("Mbps") to about 30+Mbps.

The MTAs are used to create multimedia sessions for voice video and/or data and for Voice-over-Internet Protocol ("VoIP") sessions. However, the present invention is not limited to using cable modems as MTAs or private cable television networks, or multimedia sessions and other network devices can also be used for the MTAs (e.g., set-top boxes, Internet appliances, personal digital assistants, etc.) and other types of networks can also be used (e.g., Ethernet LANs, intranets, other IP 50 networks, etc.).

Cable modems, including such as those provided by 3Com Corporation, of Santa Clara, Calif. Motorola Corporation, of Arlington Heights, Ill. Hewlett-Packard Co., of Palo Alto, Calif. Bay Networks, of Santa Clara, Calif. now a subsidiary of Nortel, of Ottawa, Ontario, Canada, Scientific-Atlanta, of Norcross, Ga. General Instruments, of Horsham, Penn. now a subsidiary of Motorola, and others offer customers high-speed connectivity to the Internet, an intranet, Local Area Networks ("LANs") and other computer networks via cable television networks. These cable modems currently support a data connection to the Internet and other computer networks via a cable television network with a data rate of up to about 30+ Mbps.

Returning to FIG. 3, the exemplary network system 64 also includes an originating cable head-end device CMTSo 74 and a terminating cable head-end device CMTSt 76 that connect the MTAs 66 and 68 to a public IP 50 network 78 such as the Internet or an intranet. In one exemplary preferred embodiment of the present invention, the originating and terminating cable head-end devices are Cable Modem Termination Systems ("CMTS"). However, the present invention is not limited to such devices and other devices can also be used.

In one preferred embodiment of the present invention, the CMTSo 74 and CMTSt 76 are Total Control Hubs by 3Com Corporation of Santa Clara, Calif. with cable modem termination units. A Total Control hub is a chassis with multiple networking cards connected by a common bus. An exemplary Total Control hub is described in U.S. Pat. No. 5,528,595, granted to Dale M.Walsh et al., and is incorporated herein by reference. However, the CMTSo 74 and CMTSt 76 can also be other network servers including those by Cicso Systems, Inc., of San Jose, Calif. Lucent Technologies of Murray Hill, N.J., including the Lucent subsidiaries of Livingston Enterprises, Inc. of Pleasanton, Calif. and Ascend Communications of Alameda, Calif. and others.

Returning to FIG. 3, the exemplary network system 64 further includes an originating Gate Controller device ("GCo") 80 and a termination Gate Controller device ("GCt") 82. The Gate Controller devices GCo 80 and GCt 82 are devices that facilitate call set-up, call tear-down, and access to administrative service such as directory services, billing, etc.

The exemplary network system 64 further includes an originating Host Tunnel Terminator ("HTTo") 84 and a terminating Host Tunnel Terminator ("HTTt") 86. The Host Tunnel Terminators HTTo 84 and HTTt 86 allow a secure virtual tunnel 88 to be used between the originating MTAo 66 and the terminating MTAt 70 over the public IP 50 network 78.

The exemplary network system 62 further includes, private IP 50 addresses, designated as "device-priv@," where "device" is a network device in the exemplary network system 64. The private IP 50 addresses include addresses for the MTAs, CMTSs, GCs and HTTs designated as MTAo-priv@, MTAt-priv@, CMTSo-priv@, CMTSt-priv@, GCo-priv@, GCt-priv@, HTTo-priv@ and HTTt-priv@ respectively.

The private IP 50 addresses described are allocated from a range of private IP 50 addresses designated by the IETF that were described above (e.g., 10.x.y.z). The network devices in exemplary network system 62 may have a range of private IP 50 addresses similar to those illustrated for private network-x 12 in FIG. 1 (i.e., 10.0.0.1–10.x.y.z).

The exemplary network system 62 further includes a smaller number of public IP 50 addresses designated as "device-pub@." For example, the CMTSs, GCs and the HTTs may have public IP 50 addresses. FIG. 3 illustrates public IP 50 addresses only for the HTTo 68 and the HTTt 72 for the sake of simplicity.

Network devices on the private network-x 68 and the private network-y 72 communicate with each other using the private network addresses. Network devices on the private network-x 68 and the private network-y 72 communicate with the public IP 50 network 78 using a smaller number (e.g., one) of public, globally routable IP 50 address assigned to the CMTSs 74, 76 and/or the GCs 80, 82.

In a preferred embodiment of the present invention, the originating MTAo 66 and the terminating MTAt 68 are assigned a pair of different, pseudo-random, private IP 50 addresses MTAo-priv@ and MTAt-priv@. The MTAs 66 and 68 are assigned such private destination IP 50 addresses for addressing data packets, such as VoIP data packets and other types of data packets used in a multimedia session. The privately addressed data packets are securely tunneled between the originating HTTo 84 and a terminating HTTt 86 using a secure virtual tunnel 88 and 82 over the public IP 50 network 78.

As is known in the art, a "virtual tunnel" can be created by encapsulating a data packet inside another data packet. For example, an outer header is added before an inner header of a data packet (See, item 90, FIG. 3). Between the inner header and outer headers are any other headers for a data path, or security, such as security headers specific to a tunnel configuration. The outer header typically identifies the "endpoints" of the tunnel. The inner header typically identifies an original sender and recipient of the data. For more information, see "IP-in-IP tunneling," by W. Simpson, IETF RFC-1853, October 1995, incorporated herein by reference.

A secure virtual tunnel uses encryption or a security protocol such as Internet Protocol Security ("Psec") to provide endpoint-to-endpoint encryption. Endpoint-to-endpoint encryption can be provided with DES, RSA, or other appropriate encryption schemes known in the art. IPsec can also be used to protect information in IP 50 packets.

For more information in IPsec see "Security Architecture for the Internet Protocol", by S.

Kent and R. Atkinson, IETF RFC-2401, November, 1998, incorporated herein by reference.

The HTTo 84 and the HTTt 86 may or may not be integral to the CMTSo 74 and CMTSt 76. FIG. 3 illustrates HTTo 54 and HTTt 86 as separate, non-integral devices that are associated with CMTSo 74 and CMTSt 76. The private originating and terminating networks 68, 72 coordinate persistent private address assignment such that a pair of private network addresses are used for only one data stream (e.g., one VoIP call) at a time between the private networks 68, 72.

An exemplary outbound data-flow 90 is also illustrated in FIG. 3. In one exemplary preferred embodiment of the present invention, the outbound data flow 90 includes an originating MTAo 66 using a private IP 50 address of APPo-priv@ (i.e., a source ("SRC") application address) and a terminating MTAt 70 using a different private IP 50 address of APPt-priv@ (i.e., a destination ("DST") application address).

Table 1 illustrates the private network addresses used on MTAo 66, MTAt 70, HTTo 84 and HTTt 86 in the data-flow 90. However, other network addresses can also be used and the present invention is not limited to the private network addresses illustrated in Table 1. The private network addresses in data-flow 90 indicated by dashed line boxes are protected (e.g., encrypted) and not publicly readable as clear text.

TABLE 1

| | |
|---|---|
| 1. MTAo 66: | APPo-priv@ to use locally on private network-x 68 and APPt-priv@ to establish a connection session and a communications session with MTAt 70. |
| 2. HTTo 84: | A mapping from (APPo-priv@, APPt-priv@) to HTTt-priv@. |
| 3. HTTt 86: | A mapping from (APPo-priv@, APPt-priv@) to HTTo-priv@. |
| 4. MTAt 70: | APPt-priv@: to use locally on private network-y and APPo-priv@ to establish a connection session and a communication session with MTAo 66. |

To establish a data session, the MTAo 66 on private network-x 68 sets a default route to be a private address HTTo-priv@ of the HTTo 84. The HTTo 84 can determine from a static assignment or dynamically from data packets the private network address HTTt-priv@-of HTTt 86. The MTAo 66 sends data packets via the CMTSo 74, the HTTo 84, and through the secure virtual tunnel 88. The HTTt 86 on the other side of the secure virtual tunnel 88 strips off the private tunnel header and forwards the data packet to the CMTSt 76 on the private network-y, which forwards the data packet to the MTAt 70. An inbound data flow (not illustrated in FIG. 3) is similar to the outbound data flow except the source and destination addresses are reversed.

Persistent Private Network Addresses

The private network-x 66 and the private network-y 70 include a total number of private network addresses and a total number of private network addresses already in use. Table 2 illustrates terminology used to described such private network addresses.

TABLE 2

$A_x$ - A total number of private addresses on a private network-x.
$A_y$ - A total number of private addresses on a private network-y.
$R_x$ - A total number of private addresses already in use on the private network-x.
$R_y$ - A total number of private addresses already in use on the private network-y.

Equation 1 illustrates a probability that a randomly selected private IP 50 address is already in use on network-y.

$$U_y = R_y/A_y \qquad (1)$$

Equation 1 also illustrates a utilization $U_y$ of network-y. A heavily utilized network typically has allocated a large number of private addresses, which makes the selection process for another randomly selected private IP 50 address more difficult.

Given at least two private addresses are used on a per multimedia stream (i.e., one for the originating end and one for the terminating end) it is desirable to determine a probability, $\rho_y$, such that if network-x offers a set of n private network addresses to network-y, that network-y will be able to determine at least one pair of private addresses from the set that is not already in use on network-y. This probability $\rho_y$ can also be written as a simple combinatorial function illustrated in Equation 2.

$$\rho_y = \sum_{i=2}^{n} \binom{n}{i} (1-U_y)^i U_y^{n-i} \qquad (2)$$

$$\rho_y = 1 - U_y^n - nU_y^{n-1}(1-U_y)$$

$$\rho_y = 1 - U_y^n[U_y + n(1-U_y)]$$

However, the present invention, is not limited to Equation 2. Virtually any method can be used to determine a probability $\rho_y$ such that if network-x offers a set of n private network addresses to private network-y, that network-y will be able to determine at least one pair of private network addresses from the set that are not already in use on network-y.

Given Equation 2, $U_y$ is a probability of a "successful" persistent private address offer. In a "successful" private address offer, private network-y will find at least one pair of unused persistent private network address on network-y from the set of n persistent private network addresses sent by private network-x. Given $U_y$ for any set of n-private addresses and n-number of private addresses, $\rho_y$ can be determined experimentally as is illustrated by the exemplary data Table 3 generated using Equation 2.

Table 3 was generated using a selected network configured with a selected set of configuration parameters. However, other methods, networks and configuration parameters can also be used to generate data similar to that illustrated in Table 3, and the present invention is not limited to values of $\rho_y$ generated with Equation 2.

For example, as is illustrated in Table 2, with $U_y=0.1$ and n=5, gives a probability of success $\rho_y$ of about 99.9% or 99+%. That is, if network-y is 10% utilized, negotiating one new pair of private IP 50 addresses with an initial set size of 5 private network addresses gives a probability of success for $\rho_y$ of over 99.9%. In contrast, when $U_y=0.5$ and n=5, gives a probability of success for $\rho_y$ of only about 80%. In the latter case, it would be expected that 20% of all private address requests would require at least one re-negotiation (i.e., there is a 20% failure rate). In contrast, for heavily utilized networks, (e.g., $U_y=0.9$), a private address offer would have to include 50 or more private addresses in order to achieve a probability of success $\rho_y$ of only about 95%. Thus, one or more negotiations would typically be required on a network that is so heavily utilized.

In a preferred embodiment of the present invention, persistent private network addresses are requested with either a new persistent private network address protocol, or requested with a new option in an existing protocol (e.g., DHCP, H.323, H.324, H.223, H.225, etc.). A "persistent" private network address exists at least for a duration of a multimedia session and is unique on a first and second private network (e.g., only one instance of the persistent private network address 10.x.y.z exists on the first and second private networks during a given multimedia session). If a request for a pair of persistent private network addresses request should fail and require re-negotiation, the new persistent private network address allocation protocol or an existing protocol with the persistent private network address new option will return an error status to an application requesting a pair of persistent private network addresses. The application would then select a new set of persistent private network addresses and then make another request for a pair of persistent private network addresses. The re-negotiation continues from the private network-x until one pair of persistent private network addresses are reserved on the private network-y, or a final failure status is returned, indicating that a pair of persistent private network addresses cannot be allocted.

Dynamic Persistent Private Network Address Allocation

Figure 4:
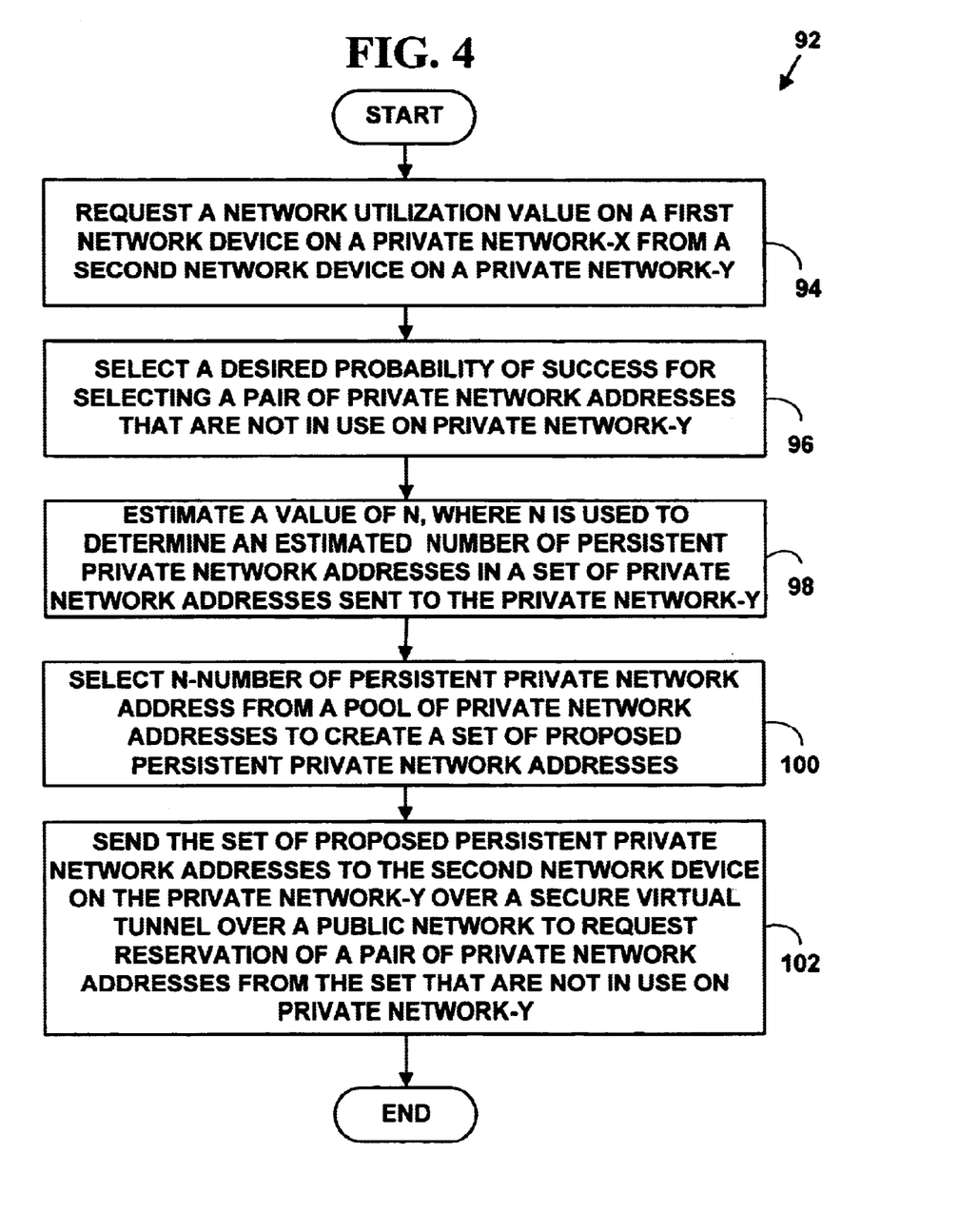
FIG. 4 is a flow diagram illustrating a method for dynamic persistent private network address allocation.

FIG. 4 is a flow diagram illustrating a Method 92 for persistent private network address allocation. At Step 94, a network utilization value is requested on a first network device on a private network-x from a second network device on a private network-y. In another embodiment of the present invention, a network utilization value is periodically broadcast by a network device on the second private network-y and stored in a table on the private network-x. At Step 96, a desired probability of success is selected on the first network device for selecting a pair of persistent private network addresses that are not in use on the private network-y. At Step 98, a value of n is estimated. The estimated value of n is used to determine an estimated number-n of persistent private network addresses to be included in a set of persistent private network addresses sent from the first network device on the private network-x to the second network device on the private network-y. Using the estimation of n, the private network-x can expect the private network-y to select at least one pair of persistent private network addresses from the n-number of persistent private network

TABLE 3

|         | 5    | 10   | 15   | 20   | 25   | 30   | 35   | 40   | 45   | 50   |
|---------|------|------|------|------|------|------|------|------|------|------|
| $U_y = 0.1$ | 99+% | 99+% | 99+% | 99+% | 99+% | 99+% | 99+% | 99+% | 99+% | 99+% |
| $U_y = 0.3$ | 98%  | 99+% | 99+% | 99+% | 99+% | 99+% | 99+% | 99+% | 99+% | 99+% |
| $U_y = 0.5$ | 80%  | 98%  | 99+% | 99+% | 99+% | 99+% | 99+% | 99+% | 99+% | 99+% |
| $U_y = 0.7$ | 50%  | 85%  | 97%  | 98%  | 99+% | 99+% | 99+% | 99+% | 99+% | 99+% |
| $U_y = 0.9$ | 10%  | 28%  | 45%  | 60%  | 72%  | 80%  | 89%  | 91%  | 93%  | 95%  | addresses sent that are not in use on the private network-y with a high probability of success (e.g., about 99.9% or greater). At Step 100, n-number of persistent private network addresses are selected from a pool of persistent private network addresses available on the private network-x using the estimated value of n to create a set of proposed persistent private network addresses. The set of proposed persistent private network addresses are not in use on the private network-x. At Step 102, the set of proposed persistent private network addresses is sent from the first network device on the private network-x to the second network device on the private network-y over a secure virtual tunnel over a public network to request reservation of one persistent private network address from the set of proposed network addresses that is not in use on the private network-y.

In another exemplary preferred embodiment of the present invention, the estimated value of n is stored in a table on the first network device. Stored estimated values of n from the table are used for selecting subsequent n-number of persistent private network addresses from a pool of persistent private network addresses available on the first network device to create subsequent sets of proposed persistent private network addresses.

In one exemplary preferred embodiment of the present invention, the second network device selects a pair of persistent private network address from the set of proposed persistent private network addresses and sends a verification back to first network device over the secure virtual tunnel over the public network. The verification includes an indication of which pair of persistent private network address were selected. The second network device uses one of the selected persistent private network addresses. The first network device uses the other persistent private network address.

The proposed set of persistent private network addresses was selected from private network addresses that were not being used on the private network-x. This pair of persistent private network addresses is used to establish a communications session, such as a multimedia communication session between a network-device on the private network-x and another network device on the private network-y. Multiple persistent private network addresses may also be obtained from the private network-y for use on multiple separate multimedia channels using Method 92.

In one exemplary preferred embodiment of the present invention, Method 92 is used with the network devices and network addresses from exemplary network system 64. However, the present invention is not limited to such an embodiment and other network systems with other network devices and network addresses can also be used.

In one exemplary preferred embodiment of the present invention, an application on MTAo 66 on the private network-x initiates a request for a communications session, such as a multimedia session, with the MTAt 70 on the private network-y via CMTSo 74. However, in another embodiment of the present invention, the MTAo 66 can also initiate a multi-media session with a request for a persistent private network address from persistent private network address server (e.g., a Dynamic Host Configuration Protocol ("DHCP") server, or other address server that can allocate persistent private network addresses) or other network device (e.g., GCo 80) that may be used to allocate persistent private network addresses on the private network-x.

At Step 94, the CMTSo 74 requests a network utilization value $U_y$ (e.g., Equation 1) from the CMTSt 76 on the private network-y 72. At Step 96, a desired probability of success $\rho_y$ (e.g., Equation 2) is selected on the CMTSo 74 for selecting a pair of persistent private IP 50 addresses that are not in use on the private network-y 72. In one preferred embodiment of the present invention, Step 96 includes preferably selecting a desired probability of success $\rho_y$ (e.g., Equation 2) of at least 0.999. However, other values can also be used for the desired probability of success $\rho_y$ and the present invention is not limited to a value of at least 0.999.

At Step 98, a value of n is estimated (e.g., by solving for n in Equation 2). The estimated value of n is used to determine an estimated number-n of persistent private IP 50 addresses included in a set of persistent private IP 50 addresses sent from CMTSo 74 to the CMTSt 76 to request a pair of private IP 50 addresses that are not in use on the private network-y 72. One exemplary preferred embodiment of the present invention includes preferably estimating a value of n with the network utilization value $U_y$ (e.g., Equation 1) to be the smallest value of n such that a desired probability of success $\rho_y$ (e.g., Equation 2) is greater than 0.999. However, other values of n can also be used to estimate n and the present invention is not limited to this estimation of n.

At Step 100, n-number of private IP 50 addresses are selected from a pool of private IP 50 addresses available on the private network-x 68 (e.g., 10.0.0.0/8, 172.16.0.0/12 or 192.168.0.0/16) using the estimated value of n to create a set of proposed private IP 50 addresses. The n-number of private IP 50 addresses selected are not in use on the private network-x.

In one exemplary preferred embodiment of the present invention, the n-number of persistent private network addresses are selected from a range of persistent private network addresses using the network utilization value and/or estimated value of n as an index into a pool of persistent private network addresses. For example, if the network utilization value $U_y$=0.1 (i.e., the network is 10% utilized) and n=5, the set of proposed private IP 50 addresses may be selected from a first range or persistent private network addresses (e.g., 10.0.0.15–10.0.0.40). If the network utilization value $U_y$=0.9 (i.e., the network is 90% utilized) and n =5, the proposed set of private IP 50 addresses may be selected from a second range of persistent private network addresses (e.g., 10.0.0.100–10.0.0.254). However, the present invention is not limited to this selection process and virtually any selection process can be used to select n-number of persistent private network addresses from the pool of persistent private network addresses.

At Step 102, the set of proposed private IP 50 addresses is sent from the CMTSo 74 to the CMTSt 76 over the secure virtual tunnel 88 via the public IP 50 network 78 to request reservation of a pair of private IP 50 addresses from the set of proposed private IP 50 addresses that are not in use on the private network-y 72.

The CMTSt 76 selects a pair of private IP 50 address from the set of proposed private IP 50 addresses and sends a verification back to the CMTSo 74 over the secure virtual tunnel 88 over the public IP 50 network 78. The verification includes an indication of which private pair of persistent IP 50 addresses were selected. The two network addresses are sent to the MTAo 64 by the CMTSo 74. The MTAo 64 uses one persistent private IP 50 address on the private network-x and uses the other persistent private IP 50 address from the pair of persistent private IP 50 addresses selected to establish a communications session (e.g., VoIP call or other multimedia session) over the public network 78 with MTAt 70.

In another exemplary preferred embodiment of the present invention, the request for the network utilization value from the private network-x 72 at Step 94 is replaced with the step of estimating a network utilization for the private network-y 72 using a calculated network utilization value UX for the private network-x 68. The calculated network utilization value UX is calculated using Equation 3.

$$U_x = R_x/A_x \qquad (3)$$

It has been determined experimentally from a number of private networks that Equation 3 is a good network utilization estimation heuristic if private networks x and y have an identical private address space, or approximately the same size private address space and are located in the same time zone. However, other heuristics and other methods can also be used to estimate a network utilization value for the private network-y and the present invention is not limited to using Equation 3 or the estimation heuristics described.

Persistent Private Network Address Allocation With Table Lookup

Figure 5:
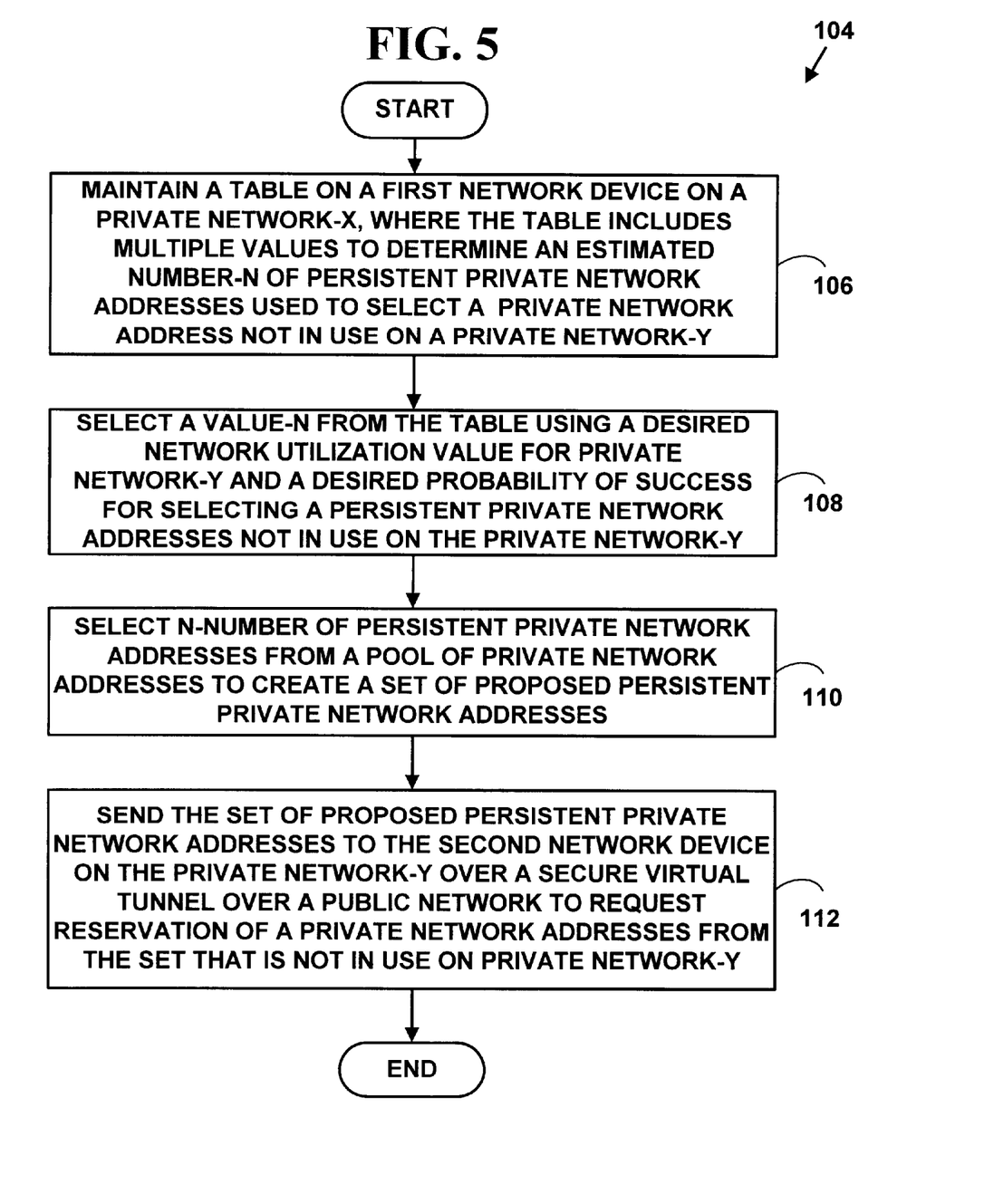
FIG. 5 is a flow diagram illustrating a method for persistent private network address allocation with table lookup.

FIG. 5 is a flow diagram illustrating a Method 104 for persistent private network address allocation with table lookup. At Step 106, a table is maintained on a first network device on a first private network-x. The table includes multiple values of n used to determine an estimated number-n of persistent private network addresses included in a set of persistent private network addresses sent from the first network device to a second network device on a private network-y to request a persistent private network address that is not in use on the private network y.

At Step 108, a value-n is selected from the table using a desired network utilization value for the private network-y and a desired probability of success. The selected value-n is used to determine an estimated number-n of persistent private network addresses included in a set of persistent private network addresses sent from the first network device to the second network device to request a pair of persistent private network addresses that are not in use on the private network-y. At Step 110, n-number of persistent private network addresses are selected from a pool of persistent private network addresses available on the private network-x using the selected value of n to create a set of proposed persistent private network addresses. At Step 112, the set of proposed persistent private network addresses is sent from the first network device to the second network device over a secure virtual tunnel over a public network to request reservation of a pair of private network address from the set of proposed private network addresses that are not in use on the private network-y.

In one exemplary preferred embodiment of the present invention, Method 104 is used with the network devices and network addresses from exemplary network system 64. However, the present invention is not limited to such an embodiment and other network systems with other network devices and network addresses can also be used.

At Step 106, a table is maintained on CMTSo 74 on the first private network-x 68. For example, Table 3 above is one exemplary table that can be maintained. The table can be statically maintained or dynamically modified and maintained. The data illustrated in Table 3 may be used as is or rearranged and/or expanded so the probability of success values appear across the top of the columns instead of the desired n-values. However, other tables with more or less resolution may also be used, and the present invention is not limited to the table illustrated by Table 3.

At Step 108, a value-n is selected from the table using a desired network utilization value $U_y$ for the private network-y 72 and a desired probability of success $\rho_y$. For example, if the desired network utilization value $U_y$ is=0.5 and the desired probability of success $\rho_y$ =98%, a value-n of 10 (via row 3 and column 2 in Table 3 and the column heading of 10) is selected from Table 3. At Step 110, n-number of persistent private network addresses are selected from a pool of private IP 50 addresses available on the private network-x 68 using the selected value of n to create a set of proposed private IP 50 addresses. At Step 112, the set of proposed private IP 50 addresses is sent from the CMTSo 74 to the CMTSt 76 over the secure virtual tunnel 88 over the public IP 50 network 78.

In one exemplary preferred embodiment of the present invention, the CMTSt 76 selects a pair of persistent private IP 50 addresses from the set of proposed private IP 50 addresses and sends a verification back to the CMTSo 74 over the secure virtual tunnel 88 over the public IP 50 network 78. The verification includes an indication of which persistent pair of persistent private IP 50 address was selected. The two network addresses are sent to the MTAo 64 by the CMTSo 74. The MTAo 64 uses one persistent private IP 50 address on the private network-x and uses the other persistent private IP 50 address to establish a communications session (e.g., VoIP call or other multimedia session) over the public network 78 with the MTAt 70.

The methods and system described herein allow a first private network to determine an estimated number of persistent private IP 50 addresses to send to a second private network. The second private network can select at least one pair of persistent private IP addresses from the estimated number of persistent private IP 50 addresses that are not in use on the second private network with high probability of success (e.g., about 99.9% or greater). The methods and system may improve setup times for multimedia sessions (e.g., VoIP) and improve network utilization. The methods and system may improve security of multimedia sessions and allow two private networks using private IP addresses to communicate over a public network like the Internet.

It should be understood that the programs, processes, methods, systems and apparatus described herein are not related or limited to any particular type of computer apparatus (hardware or software), unless indicated otherwise. Various types of general purpose or specialized computer apparatus may be used with or perform operations in accordance with the teachings described herein. While various elements of the preferred embodiments have been described as being implemented in software, in other embodiments hardware or firmware implementations may alternatively be used and visa-versa.

In view of the wide variety of embodiments to which the principles of the invention can be applied, it should be understood that the illustrative embodiments are exemplary only, and should not be taken as limiting the scope of the present invention. For example, the steps of the flow diagrams may be taken in sequences other than those described, and more or fewer elements or component may be used in the block diagrams. The claims should not be read as limited to the described order-or elements unless stated to that effect. Therefore, all embodiments that come within the scope and spirit of the following claims and equivalents thereto are claimed as the invention.

We claim:

1. In a computer network with a private network-x connected to a private network-y via a one or more public networks, a method for allocating persistent private network addresses, comprising the steps of:

requesting a network utilization value on a first network device on a private network-x from a second network device on a private network-y;

selecting a desired probability of success on the first network device for selecting a pair of persistent private network addresses that are not in use on the private network-y;

estimating a value of n, wherein the estimated value of n is used to determine an estimated number-n of persistent private network addresses included in a set of persistent private network addresses sent from the first network device to the second network device to request a pair of persistent private network addresses that are not in use on the private network-y;

selecting n-number of persistent private network addresses from a pool of persistent private network addresses available on the private network-x using the estimated value of n to create a set of proposed persistent private network addresses; and sending the set of proposed persistent private network addresses from the first network device to the second network device over a secure virtual tunnel over a public network to request reservation of a pair of persistent private network addresses from the set of proposed persistent private network addresses that are not in use on the private network-y.

2. A computer readable medium have stored therein instructions for causing a central processing unit to execute the method of claim 1.

3. The method of claim 1 further comprising:

storing the estimated value of n in a table on the first network device; and using stored estimated values of n from the table for selecting subsequent n-number of persistent private network addresses from a pool of persistent private network addresses available on the first network device to create subsequent sets of proposed persistent private network addresses.

4. The method of claim 1 further comprising:

selecting a pair of persistent private network addresses from the set of proposed persistent private network addresses on the second network device; and sending a verification back to first network device over the secure virtual tunnel over the public network, wherein the verification indicates which pair of persistent private network address has been selected, and wherein the selected pair of persistent private network addresses are used to establish a communications session between the private network-x and the private network-y.

5. The method of claim 1 wherein the step of estimating a value of n includes solving for n with:

$$\rho_y = 1 - U_y^n [U_y + n(1 - U_y)],$$

wherein $\rho_y$ is the desired probability of success for selecting a pair of persistent private network addresses that are not in use on the private network-y and $U_y$ is a network utilization for the private network-y.

6. The method of claim 1 wherein the step of selecting a desired probability of success includes selecting a desired probability of success of at least 0.999.

7. The method of claim 1 wherein the step of estimating a value of n includes estimating a value of n with the network utilization value to be the smallest value of n such that a desired probability of success is greater than 0.999.

8. The method of claim 1 wherein the network utilization value includes a total number of persistent private network addresses available on the private network-y divided by a total number of persistent private network addresses in use on the private network-y.

9. The method of claim 1 wherein the persistent private network addresses are private Internet Protocol addresses.

10. The method of claim 1 wherein the public network is the Internet or an intranet.

11. The method of claim 1 wherein the private network-x and the private network-y are private local area networks that use private Internet Protocol addresses for a plurality of network devices attached thereon for local communications.

12. The method of claim 1 wherein the network utilization value includes a probability that a randomly chosen private Internet Protocol address is not already in use on the private network-y.

13. The method of claim 1 wherein the step of selecting n-number of persistent private network addresses from a pool of persistent private network addresses includes selecting the n-number of persistent private network addresses from a range of persistent private network addresses using the network utilization value as an index into the pool of persistent private network addresses.

14. The method of claim 1 wherein the first network device and the second network device is any of a cable modem termination system, or a persistent private network address server used to allocate persistent private network addresses.

15. In a computer network with a private network-x connected to a private network-y via one or more public networks, a method for allocating persistent private network addresses, comprising the steps of:

estimating a network utilization value for a private network-y on the first network device on the private network-x;

estimating a value of n, wherein the estimated value of n is used to determine an estimated number-n of persistent private network addresses included in a set of persistent private network addresses sent from the first network device to the second network device to request a pair of persistent private network addresses that are not in use on the private network-y;

selecting n-number of persistent private network addresses from a pool of persistent private network addresses available on the private network-x using the estimated value of n to create a set of proposed persistent private network addresses; and sending the set of proposed persistent private network addresses from the first network device to the second network device over a secure virtual tunnel over a public network to request reservation of a pair of persistent private network addresses from the set of proposed persistent private network addresses that are not in use on the private network-y.

16. A computer readable medium have stored therein instructions for causing a central processing unit to execute the method of claim 15.

17. The method of claim 15 wherein the step of estimating a network utilization value for private network-y on first network device on a private network-x includes dividing a total number of persistent private network addresses available on the private network-x divided by a total number of persistent private network addresses in use on the private network-x.

18. The method of claim 15 wherein the step of estimating a network utilization value includes applying a heuristic to determine if the private network-x and the private network-y have are using the same number of persistent private network addresses and if the private network-x and the private network-y are located in the same time zone.

19. In a computer network with a private network-x connected to a private network-y via one or more public networks, a method for allocating persistent private network addresses with table lookup, comprising the steps of:

maintaining a table on a first network device-on a first private network-x, wherein the table includes a plurality of values used to determine an estimated number-n of persistent private network-addresses included in a set of persistent private network addresses sent from the first network device to a second network device on a second private network-y to request a pair of persistent private network addresses that are not in use on the private network-y, and wherein the plurality of values were estimated using a plurality of network utilization values for the private network-y and a plurality of desired probability of success values for selecting a pair of persistent private network addresses that are not in use on the private network-y;

selecting a value-n from the table using a desired network utilization value for the private network-y and a desired probability of success, wherein the selected value-n is used to determine an estimated number-n of persistent private network addresses included in a set of persistent private network addresses sent from the first network device to the second network device to request a pair of persistent private network addresses that are not in use on the private network-y;

selecting n-number of persistent private network addresses from a pool of persistent private network addresses available on the private network-x using the selected value-n to create a set of proposed persistent private network addresses; and sending the set of proposed persistent private network addresses from the first network device to the second network device over a secure virtual tunnel over a public network to request reservation of a persistent private network addresses from the set of proposed persistent private network address that not in use on the private network-y.

20. A computer readable medium have stored therein instructions for causing a central processing unit to execute the method of claim 19.

21. The method of claim 19 wherein the persistent private network addresses include private Internet Protocol Addresses.

22. The method of claim 19 wherein the step of maintaining a table includes receiving a periodic broadcast of network utilization values from the private network-y and storing the network utilization values in the table on the private network-x.

* * * * *